United States Patent
Lowe et al.

(10) Patent No.: US 10,408,225 B1
(45) Date of Patent: *Sep. 10, 2019

(54) EXTRUDED CEILING FAN BLADE AND METHOD OF MAKING BLADE

(71) Applicant: Chien Luen Industries Co., Ltd., Inc., Oakland Park, FL (US)

(72) Inventors: Tien S. Lowe, Cooper City, FL (US); Eliezer E. Rivera, Plantation, FL (US); Zachary Zauhar, Dania Beach, FL (US)

(73) Assignee: Chien Luen Industries, Co., Ltd., Inc., Oakland Park, FL (US)

( * ) Notice: Subject to any disclaimer, the term of this patent is extended or adjusted under 35 U.S.C. 154(b) by 254 days.

This patent is subject to a terminal disclaimer.

(21) Appl. No.: 15/468,477

(22) Filed: Mar. 24, 2017

Related U.S. Application Data

(62) Division of application No. 13/923,927, filed on Jun. 21, 2013, now Pat. No. 9,605,546.

(60) Provisional application No. 61/662,445, filed on Jun. 21, 2012.

(51) Int. Cl.

| | |
|---|---|
| F04D 29/38 | (2006.01) |
| F04D 25/08 | (2006.01) |
| B29C 48/00 | (2019.01) |
| B29C 48/07 | (2019.01) |
| B29C 48/21 | (2019.01) |
| B29C 48/17 | (2019.01) |
| B29C 48/285 | (2019.01) |
| B29C 48/80 | (2019.01) |
| B29K 25/00 | (2006.01) |
| B29K 105/00 | (2006.01) |
| B29L 31/08 | (2006.01) |

(52) U.S. Cl.
CPC .......... *F04D 29/388* (2013.01); *B29C 48/001* (2019.02); *B29C 48/0022* (2019.02); *B29C 48/022* (2019.02); *B29C 48/07* (2019.02); *B29C 48/175* (2019.02); *B29C 48/21* (2019.02); *B29C 48/287* (2019.02); *B29C 48/802* (2019.02); *F04D 25/088* (2013.01); *B29K 2025/06* (2013.01); *B29K 2105/0032* (2013.01); *B29L 2031/082* (2013.01)

(58) Field of Classification Search
CPC ... F04D 29/388; F04D 25/088; B29C 48/175; B29C 48/0022; B29C 48/21; B29C 48/802; B29C 48/287; B29C 48/07; B29C 48/001; B29C 48/022; B29K 2025/06; B29K 2105/0032; B29L 2031/082
See application file for complete search history.

(56) References Cited

U.S. PATENT DOCUMENTS

| | | | |
|---|---|---|---|
| 2,174,779 | A | 10/1939 | Delorme |
| 3,480,373 | A | 11/1969 | Talbot |
| 3,769,380 | A | 10/1973 | Wiley |
| 3,966,839 | A | 6/1976 | Sims |
| 4,100,237 | A | 7/1978 | Wiley |
| 5,669,760 | A | 9/1997 | Chen |

(Continued)

*Primary Examiner* — Jeffrey M Wollschlager
(74) *Attorney, Agent, or Firm* — Brian S. Steinberger; Hilary F. Steinberger; Law Offices of Brian S. Steinberger, P.A.

(57) ABSTRACT

Novel extruded ceiling fan blades, compositions and methods of making the blades from plastic material such as polystyrene are disclosed. The blades can be formed from two extruders so that different colors and/or finishes, such as wood grain looks can be formed on the upper and lower surfaces of the blades.

10 Claims, 3 Drawing Sheets

(56) References Cited

U.S. PATENT DOCUMENTS

| | | |
|---|---|---|
| 5,738,935 A | 4/1998 | Turk |
| 6,042,895 A | 3/2000 | Huang |
| 6,106,235 A | 8/2000 | Tettenborn |
| 6,514,304 B2 | 2/2003 | Fiacco |
| 6,939,108 B2 | 9/2005 | Boyd |
| 7,150,162 B1 | 12/2006 | Brunner |
| 7,625,186 B1 | 12/2009 | Lueddecke |
| 8,298,466 B1 | 10/2012 | Yang |
| 2002/0182076 A1 | 12/2002 | Bucher |
| 2006/0038310 A1 | 2/2006 | Lipson |
| 2007/0154689 A1 | 7/2007 | Hughes |
| 2009/0263254 A1 | 10/2009 | Bucher |
| 2010/0159213 A1 | 6/2010 | Przybylinski |
| 2012/0040582 A1 | 2/2012 | Topolkaraev |
| 2014/0041602 A1 | 2/2014 | Christensen-Dalsgaard |

FIG. 1

100. supplying polystyrene having a first color into a first extruder
supplying polystyrene having a second color into a second extruder 200. extruding out a first part with the first extruder
extruding out a second part with a second extruder 300. combining the first part and the second part into a dye to form a ceiling fan blade therefrom 400. cutting blade part into a ceiling fan blade shape 500. drilling holes in the fan blade for attachment to blade arms 600. sanding leading and trailing edges of the blade to a desired and selected shape

EXTRUDED CEILING FAN BLADE AND METHOD OF MAKING BLADE

CROSS REFERENCE TO RELATED APPLICATION

This application is a Divisional of U.S. patent application Ser. No. 13/923,927 filed Jun. 21, 2013, now U.S. Pat. No. 9,605,546, which claims the benefit of priority to U.S. Provisional Application Ser. No. 61/662,445 filed Jun. 21, 2012. The entire disclosure of each of the applications listed in this paragraph are incorporated herein by specific reference thereto.

FIELD OF INVENTION

This invention relates to ceiling fans, and in particular to extruded ceiling fan blades, compositions and methods of making solid ceiling fan blades formed from polystyrene.

BACKGROUND AND PRIOR ART

Traditional types of ceiling fan blades have been formed from solid wood and molded plastic core type materials, such as ABS(Acrylonitrile Butadiene Styrene) or PVC (poly vinyl chloride). See for example, U.S. Pat. No. 5,669,760 to Chen. However, there are increasing numbers of problems with using these types of materials.

For example, wood and ABS and PVC blades can warp over time when exposed to different heat temperatures, and can become both unsightly, unbalanced and must be replaced.

Additionally, the solid core wood and ABS and PVC blades require more power and electrical costs to rotate their masses over lighter weight materials, which further increases the costs of operation whenever the ceiling fans use three or more blades or the fans have larger diameter wingspans.

Using light weight versions of these materials such as balsa wood and thin plastic is not practical since the blades can wobble and easily chip, crack and break during use.

Still furthermore, traditional wood and ABS and PVC blades can become unstable due to continuous UV (ultra violet) exposure, and wood surfaces can also fade over time.

Additionally, the cost of wood or wood substitute products such as MDF (medium density fibreboard) has become increasingly expensive over time and untreated wood is not resistant to mold and mildew which further effects the cost since the lifespan of the blades may be reduced over time. Wood type materials can be prone to absorbing moisture which can add to the weight as well as the mold and mildew effects. MDF is prone to drooping over time.

The cost of ABS type plastics have also become increasingly expensive overtime since plastic is petroleum based which has become substantially more and more expensive over time. There are other disadvantages to using ABS plastic that include limited weather resistance and moderate heat, moisture and chemical resistance which would limit the use of this material to outdoor fans. Additionally, ABS is highly flammable with high smoke generation which would make its' use further undesirable in residential or commercial locations as being a fire hazard. PVC has similar problems. Modifying ceiling fans to add colors, such as wood grain surfaces, and different color tints has not been an inexpensive process. Currently wood blades would need to be stained and coated with additional water proof coatings. Similarly ABS and PVC type plastic fan blades need separate colored coatings. Molded plastic blades may be able to be formed having single color. However, changing the color on side generally requires painting on a different surface coating. Thus, to change the outer colors of traditional wood and molded ABS or plastic or PVC blades adds additional labor and material costs which are then passed onto the consumer.

Thus, the need exists for solutions to the problems with the prior art.

SUMMARY OF THE INVENTION

A primary objective of the present invention is to provide polystyrene extruded ceiling fan blades, compositions and methods of making the blades.

A secondary objective of the present invention is to provide polystyrene plastic extruded ceiling fan blades that are lighter in weight than wood blades.

A third objective of the present invention is to provide thermoplastic extruded ceiling fan blades that are approximately 15-20% lighter in weight than molded ABS plastic blades.

A fourth objective of the present invention is to provide thermoplastic extruded ceiling fan blades that is up to some 50% or more, less expensive than ABS plastic injection molded blades.

A fifth objective of the present invention is to provide thermoplastic extruded ceiling fan blades using material that is resistant to warping from heat.

A sixth objective of the present invention is to provide extruded ceiling fan blades using material that is water resistant, mold resistant and mildew resistant.

A seventh objective of the present invention is to provide extruded ceiling fan blades using material that does not absorb moisture as compared to MDF, plywood and existing hybrid ceiling fan blade materials, and is more resistant to not drooping overtime.

An eighth objective of the present invention is to provide extruded ceiling fan blades using material that remains stable under continuous UV (ultra violet) exposure.

A ninth objective of the present invention is to provide extruded ceiling fan blades using material that is resistant to fading when continuously exposed to light and UV wavelengths.

A tenth objective of the present invention is to provide extruded ceiling fan blades, compositions and methods of making the blades, that form 100% waterproof blades An eleventh objective of the present invention is to provide extruded ceiling fan blades, that can use smaller motors than traditional blades which improves the efficiency of the ceiling fan.

A twelfth objective of the present invention is to provide extruded ceiling fan blades, that require less power (in watts) than traditional blades which improves the efficiency of the ceiling fan.

A thirteenth objective of the invention is to provide extruded ceiling fan blades, compositions and methods of making the blades, where colors do not have to be separately painted and/or stained on the surface.

A fourteenth objective of the invention is to provide extruded ceiling fan blades, compositions and methods of making the blades, that allows for having different colors on each side of the blades without stains and paints.

A method of making a ceiling fan blade having different colored surfaces can include the steps of providing a first extruder and a second extruder, supplying polystyrene plastic having a first color in the first extruder, supplying polystyrene plastic having a second color into the second extruder, the second color being a different color from the first color, combining a first part feeding out of the first extruder with a second part feeding out of the second extruder into a dye, and extruding a single ceiling fan blade from the combined first part and second part, the blade having an upper surface with the first color and the blade having a lower surface with the second color.

The method can include the step of post processing the single ceiling fan blade.

The post processing step can include the step of cutting off an end portion to shorten the ceiling fan blade.

The post processing step can include the step of drilling holes in one end of the blade for attaching to a blade arm.

The post processing step can include the step of sanding or routing the ceiling fan blade.

The providing step can include the step of providing a first feed screw as the first extruder and a second feed screw as the second feed screw.

The method can include extruding at least one surface with a wood grain surface effect.

The supplying step can include the step of providing a first hopper for holding first polystyrene pellets of the first color to supply the first extruder, and providing a second hopper for holding second polystyrene pellets of the second color to supply the second extruder.

The method can include an outlet for extruding a concave curved ceiling fan blade.

The extruding step can include an outlet for extruding a substantially flat surfaced ceiling fan blade.

The extruding step can include an outlet for forming a leading edge and a trailing edge on the blade, the leading edge being narrower than the trailing edge.

A composition can include different colors of polystyrene extruded into a single ceiling fan blade.

A ceiling fan blade can include a first layer formed from extruded polystyrene of a first color, the first layer having an upper surface and a lower surface, and a second layer formed from extruded polystyrene of a second color, the first color being different from the second color, the second layer having an upper surface and a lower surface, the lower surface of the first layer adhering to the upper surface of the second layer, so that the first color of the upper surface of the first layer and the second color of the lower surface are visibly exposed.

The blade can include holes in one end of the first layer and the second layer adapted for attaching the ceiling fan blade to a blade arm.

The blade can include sanded or routed edges on the ceiling fan blade.

The blade can include an outer edge cut off to shorten the length of the ceiling fan blade.

Further objects and advantages of this invention will be apparent from the following detailed description of the presently preferred embodiments which are illustrated schematically in the accompanying drawings.

BRIEF DESCRIPTION OF THE FIGURES

FIG. 1 is a flow chart of the basic method steps to form an extruded ceiling fan blade.

DESCRIPTION OF THE PREFERRED EMBODIMENTS

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

FIG. 1 is a flow chart of the basic method steps to form an extruded ceiling fan blade. The first step 100 includes supplying polystyrene having a first color into a first extruder and supplying polystyrene having a second color into a second extruder, where the first color and the second color are different. The second step 200 includes extruding out a first part and a second part from the first extruder and the second extruder. The third step 300 combining the first part and the second part into a dye to shape a single ceiling fan blade therefrom. The next steps are post-processing the fan blade as needed. For example, the fourth step 400 can include cutting blade part into a ceiling fan blade shape. The fifth step 500 can include drilling holes in the fan blade for attachment to blade arms. The sixth step 600 can include sanding leading and trailing edges of the blade to a desired and selected shape. Alternatively, the dye can shape the blade to having flat surfaces, or concave/convex surfaces. Additionally, the dye can also form narrower leading edges and wider trailing edges as needed.

Additionally, the fourth, fifth and sixth steps can include additional post-processing to finish the blade such as a router to further shape the blade and holes drilled for attaching the blade to blade arms.

Figure 2:
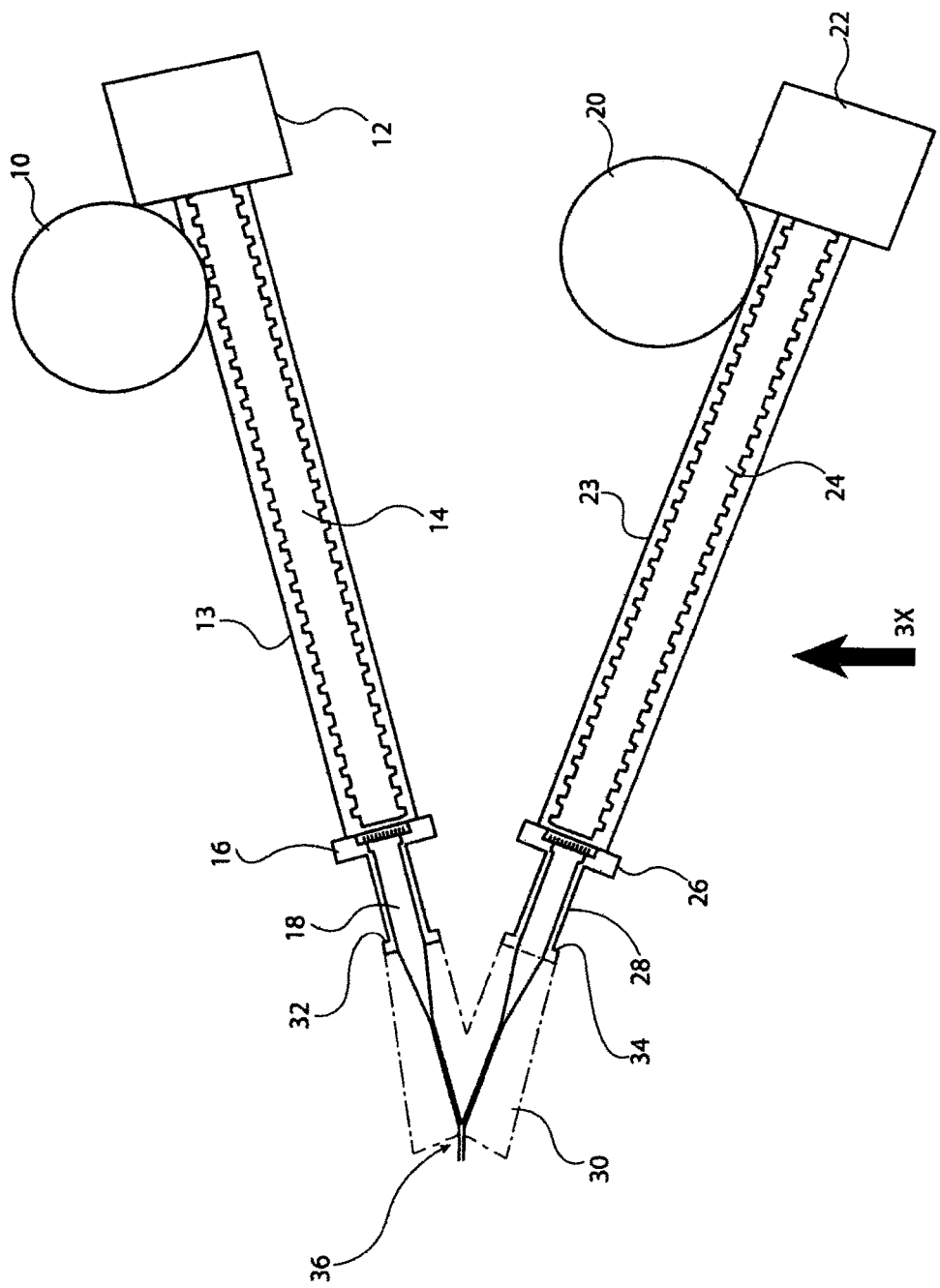
FIG. 2 shows a top view of an extruder machine for forming the extruded ceiling fan blades of the invention with different colored sides.
Figure 3:
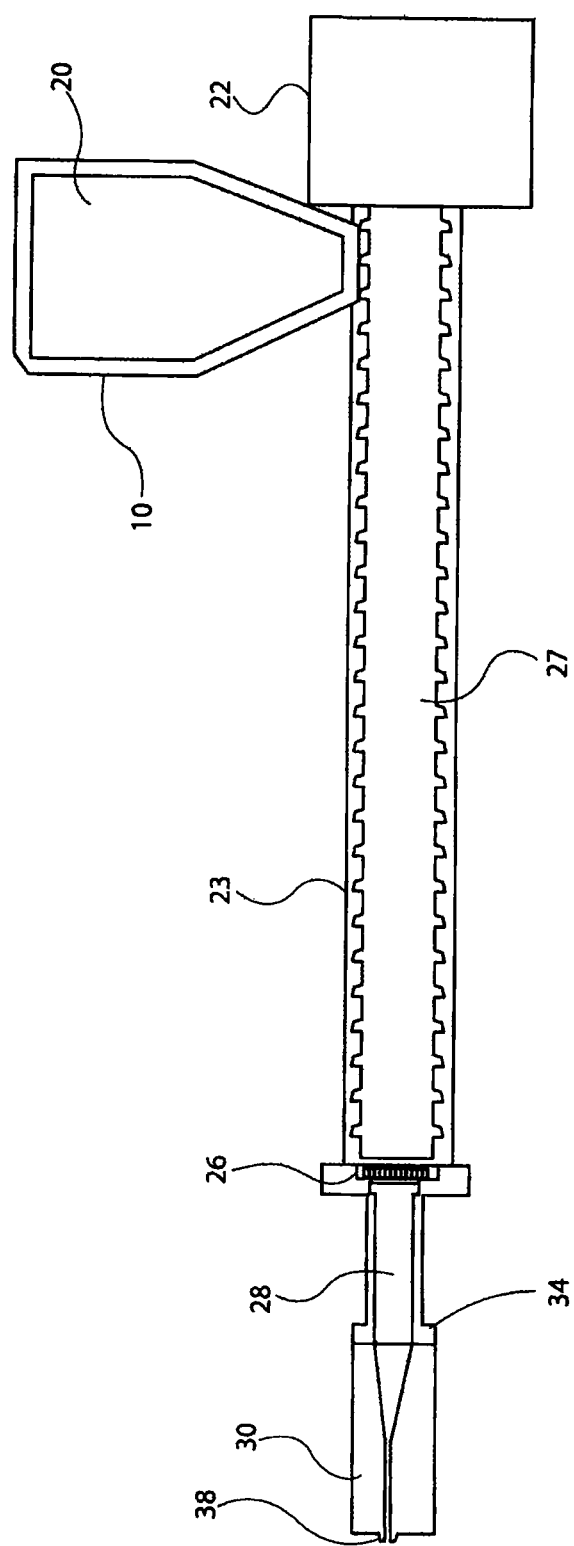
FIG. 3 is a side view of the extruder machine of FIG. 2.

FIG. 2 shows a top view of an extruder machine 1 for forming the extruded ceiling fan blades of the invention with different colored sides. FIG. 3 is a side view of the extruder machine 1 of FIG. 2.

Polystyrene pellets are the preferred source of material since other plastics, such as but not limited to PVC do not work under field conditions such as UV light conditions, and the like. ABS plastic has other problems making it undesirable as referenced in the background section of this application.

Referring to FIGS. 1-2, a pair of extruders, can each include a hopper 10, 20 that feed a plurality of polystyrene pellets into one end of barrels 14, 24. Screw conveyors 14, 24 in the barrels are rotated by electric motors 12, 22. Such screw type extruders can be such as those in U.S. Pat. No. 2,174,779, which is incorporated by reference.

Here the screws are used to push the pellets through the barrels 14, 24. Heat is applied in the barrels to melt the pellets to the breaker plates 16, 26. The breaker plates 16, 26 can be a thick metal puck with many holes drilled through it) since the pressure at this point can exceed approximately 5000 psi (approximately 34 MPa). The breaker plate assembly also serves to create back pressure in the barrels. Back pressure can be required for uniform melting and proper mixing of the polymer, and how much pressure is generated can be 'tweaked' by varying screen pack composition (the number of screens, their wire weave size, and other parameters). This breaker plate and screen pack combination also does the function of converting "rotational memory" of the molten plastic into "longitudinal memory". Approximately would be +/−10%.

The breaker plates 16, 26 directs respective extruded parts into respective feed pipes 18, 28 and into ends 32, 34 of a dye 30.

The die 30 is what gives the final product its profile and must be designed so that the molten plastic evenly flows from a cylindrical profile, to the product's profile shape.

The profile shape can be a rectangular slit to form a substantially flat blade, a frown shaped slit to form a concave/convex shaped blade, and the like. Conventional heat can be used to melt the pellets (eat with Compression used to form and customize the blade shapes. Narrow leading edges and wider trailing edges can be formed as selected.

As described above dye 30 can be formed with an outlet that can shape the extruded finished ceiling fan blade to have substantially flat surfaces. Alternatively, the blade can be shaped by an outlet to form ceiling fan blades with concave curved one side and convex curved on one side.

The pellets in the hoppers 10, 20 can be selected so that the finished blade has a different color on an upper surface than the lower surface. Additionally, the pellets can allow for one or both outer surfaces of the blade to have a wood grained effect surface. As such, the finished ceiling fan blades do not have be separately stained and/or painted as those blades in the prior art.

A completed ceiling fan blade is extruded from the outlet 36 of the dye. As referenced above, various types of post processing steps can occur, such as but not limited to cutting off the end of the blade to shorten it, sanding and/or grouting edges, and the like, and drilling holes in one of the blade in order to attach the blades to ceiling fan arms or directly to rotors on ceiling fan motors.

Density of the material when extruded can be adjusted by the pressure. The more dense the material the harder the resulting product and the less the amount of closed pores in the product. The invention does not need or require having to separately stain or paint the exterior of the blades.

The novel polystyrene extruded blades are less expensive than the prior art ABS plastic blades. The polystyrene extruded blades are lighter than ABS and are able to use smaller, cheaper motors to achieve the same air movement.

Alternatively, using the polystyrene blades with standard size motors can achieve increased air movement (more CFM (cubic feet per minute of airflow)) at less cost than using ABS plastic blades with standard motors.

The novel polystyrene extruded blades are stronger than MDF blades and are more resistant to drooping over time, which occurs with wood and MDF blades. The polystyrene extruded blades are more resistant to UV than PVC (polyvinyl chloride) material.

Unlike the prior art methods of making blades, polystyrene extruded blades can be extruded with two different colors on each side of blade. This eliminates the labor and material costs from having to paint the finished ABS or PVC blades. The novel extrusion techniques using polystyrene is able to be extruded with a wood grain pattern that is popular for ceiling fans blades.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A method of making a ceiling fan blade having different colored surfaces consisting of the steps of:

providing a first extruder and a second extruder;
supplying a first color in the first extruder;
supplying a second color into the second extruder, the second color being a different color from the first color;
uniformly heating each of the first color and the second color, to form uniform melting and mixing of the first color and to form uniform melting and mixing of the second color, wherein the step of uniformly heating includes forming a back pressure that exceeds approximately 5000 psi;
combining a first part feeding out of the first extruder with a second part feeding out of the second extruder to evenly flow into a die; and
extruding a single ceiling fan blade from the combined first part and second part, the blade having an upper surface with the first color and the blade having a lower surface with the second color; and
post processing the single ceiling fan blade, wherein at least one of the upper surface and the lower surface of the blade has a wood grain finish formed from at least one of the first color and the second color, and not by post processing.

2. The method of claim 1, wherein the step of providing a first extruder and a second extruder includes the steps of:

providing a first feed screw in a first barrel as the first extruder and a second feed screw in a second barrel as the second extruder.

3. The method of claim 1, wherein the supplying steps includes the steps of:

supplying polystyrene pellets having the first color in the first extruder;
supplying polystyrene pellets having the second color in the second extruder.

4. The method of claim 1, wherein the forming step includes the step of:

forming the back pressure that exceeds the approximately 5000 psi with a first breaker plate having a plurality of holes and forming a back pressure with a second breaker plate having a plurality of holes and adjusting the back pressure in the first breaker plate and the back pressure in the second breaker plate with wire screens.

5. The method of claim 1, wherein the post processing step includes the step of:

cutting off an end portion to shorten the ceiling fan blade.

6. The method of claim 1, wherein the post processing step includes the step of:

drilling holes in one end of the blade for attaching to a blade arm.

7. The method of claim 1, wherein the post processing step includes the step of:

sanding or routing the ceiling fan blade.

8. The method of claim 1, wherein the extruding step includes:

an outlet for extruding a concave curved ceiling fan blade.

9. The method of claim 1, wherein the extruding step includes:

an outlet for extruding a substantially flat surfaced ceiling fan blade.

10. The method of claim 1, wherein the extruding step includes:

an outlet for forming a leading edge and a trailing edge on the blade, the leading edge being narrower than the trailing edge.

\* \* \* \* \*